United States Patent [19]

Yakimischak

[11] 4,385,071
[45] May 24, 1983

[54] CHEWING GUM FLAVOR COMBINATION

[76] Inventor: Donna Yakimischak, 21-115 Sherbrook St., Winnipeg, Manitoba, Canada

[21] Appl. No.: 291,551

[22] Filed: Aug. 10, 1981

[51] Int. Cl.³ .............................................. A23G 3/30
[52] U.S. Cl. ...................................... 426/3; 426/103; 426/5
[58] Field of Search ............................... 426/3, 5, 103

[56] References Cited

U.S. PATENT DOCUMENTS

| | | | |
|---|---|---|---|
| 2,304,246 | 12/1942 | Ekert | 426/5 |
| 3,205,075 | 9/1965 | Heggie et al. | 426/5 |
| 3,622,352 | 11/1971 | Daylor, Jr. | 426/5 |
| 4,127,677 | 11/1978 | Fronczkowski et al. | 426/5 |
| 4,238,510 | 12/1980 | Cherukuri et al. | 426/5 |
| 4,317,838 | 3/1982 | Cherukuri et al. | 426/5 |

Primary Examiner—Jeanette M. Hunter
Attorney, Agent, or Firm—Stanley G. Ade

[57] ABSTRACT

An invert sugar flavored gum center of chicle or the like is coated with a flavored mixture of sucrose or dextrose or synthetic sugar free equivalents. The flavor consisting of a mixture of oil of spearmint and pepsin essence.

8 Claims, No Drawings

CHEWING GUM FLAVOR COMBINATION

BACKGROUND OF THE INVENTION

This invention relates to new and useful improvements in chewing gum, particularly chewing gum which includes an inner core of gum such as chicle or the like and an outer sugar coating enclosing the core.

Conventionally, flavouring materials are incorporated within the gum center and may be oil of peppermint, spearmint flavour, cinnamon, fruit flavours and the like.

It has been found that a better chewing gum is formed if the flavouring is incorporated with the outer coating and if it is a combination of oil of spearmint and pepsin essence which in itself is flavourless.

SUMMARY OF THE INVENTION

One aspect of the invention is therefore to provide a chewing gum comprising a sugar or sugar free sweetener and gum based inner portion with a sugar or sugar free sweetener based outer coating, said outer coating being flavoured with a mixture of spearmint flavour and pepsin essence and which results in a new and unique and enhanced flavour.

This provides an easily formulated, attractively flavoured sugar or sugar free sweetener coated gum in which the flavour is intensified due to the fact that it is in the outer coating rather than in the inner center.

With the foregoing in view, and other advantages as will become apparent to those skilled in the art to which this invention relates as this specification proceeds, my invention consists essentially in the arrangement and construction of parts all as hereinafter more particularly described.

DETAILED DESCRIPTION

Proceeding therefore to describe the invention, the chewing gum consists of an outer semi-hard coating and a gum center or interior with the flavours incorporated in the coating.

The gum coating is preferably made from a sucrose or dextrose sugar or sugar free sweetener flavoured with a mixture of spearmint flavouring and pepsin essence, said flavours being incorporated by the use of oil of spearmint and pepsin essence. An example of pepsin is given in the United States Dispensatory as follows:

ELIXER LACTATED PEPSIN which contains 3.5% of pepsin and 0.1% by volume of lactic acid in a vehicle of glycerin, alcohol and purified water and is flavoured with orange oil and coloured with amaranth.

Additionally it is listed in the American Drug Index 1973—page 482 as follows:

PEPSIN ESSENCE—Elix. N.F.

This pepsin should not be confused with pepsin/enzyme a substance obtained from the glandular layer of fresh stomach of hog. It contains a proteolytic enzyme. The N.F. (national formula) IX grade digests not less than 3000 or more than 3500 times its weight of freshly coagulated and disintegrated egg albumin in 2½ hours at 52 degrees in water acidulated with HCL. The activity of pepsin in solution is destroyed by heating above 70 degrees or by alkalies.

MEDICAL USE: has been used as a digestive aid.

The gum center consists of gum base such as chicle together with an invert sugar such as corn syrup (or artifical sweetener) for sweetening purposes and the final coating should incorporate a trace amount of shellac as a final coating to give a polished appearance to the outer surface and also to assist in preserving the flavours incorporated within the final coating.

The method of manufacture is conventional so that it is not believed necessary to describe same in this application.

The preferred proportions used in the formulation of the chewing gum center are as follows:

The following is based on 1,000 pieces or units of gum weighing approximately 1576.97 grams and having an average weight per unit of 1.5769 grams. The proposed formulation uses sugar a sweetener.

The gum coating, in this example, is as follows:
sucrose or dextrose: 1222.65 grams
oil of spearmint: 1.1663 grams
pepsin essence: 0.6754 grams The gum center formulation, in this example, is as follows:
invert sugar eg. corn syrup: 35.838 grams
gum base (chicle): 316.638 grams This gives the approximate proportion as follows but it will of course be appreciated that these can be varied within limits.

The gum center is a combination of chicle and sugar in the proportions of approximately 8.8:1 and the flavour includes oil of spearmint and pepsin essence in the ratio of approximately 1.7:1.

The total sugar to flavour ratio in the coating is approximately 664:1 but may vary from between 500 and 800:1.

It is understood artificial sweeteners may be incorporated.

It has been found that this gives an excellent balance of flavours and is a very satisfactory chewing gum formulation. The incorporation of the pepsin essence, which in itself is substantially flavourless, modifies the oil of spearmint flavour resulting in a unique, new flavour.

Although a natural sugar is used it will be appreciated that a sugar free chewing gum can be provided by substituting a synthetic sweetening agent for the sugar. One example may be Sucuryl (Trade Mark) or the like.

I claim:

1. A chewing gum comprising a gum based center containing a sweetening agent selected from the group consisting of natural sugar, sugar free natural sweeteners and synthetic sweeteners; and a sweetener based outer coating, said outer coating being flavoured with a mixture of spearmint oil modified by pepsin essence, said outer coating including spearmint flavouring and pepsin essence in the approximate ratio of 1.7:1, and the sweetener to flavour ratio of the outer coating is between 500 and 800:1.

2. The chewing gum according to claim 1 in which the outer coating includes a trace amount of shellac in a final coat to provide a polished outer surface and to preserve the flavouring of the outer coating.

3. The chewing gum according to claim 1 in which the center is formed from chicle and an invert sugar and the outer coating is formed from a sugar selected from the group consisting of sucrose, dextrose and artificial sweeteners.

4. The chewing gum according to claim 2 in which the center is formed from chicle and an invert sugar and the outer coating is formed from a sugar selected from the group of sucrose, dextrose and artificial sweeteners.

5. The chewing gum according to claim 1 in which the gum center includes chicle and sugar in the proportion of approximately 8.8:1.

6. The chewing gum according to claim 2 in which the gum center includes chicle and sugar in the proportions of approximately 8.8:1.

7. The chewing gum according to claim 3 in which the gum center includes chicle and sugar in the proportion of approximately 8.8:1.

8. The chewing gum according to claim 4 in which the gum center includes chicle and sugar in the proportion of approximately 8.8:1.

* * * * *